United States Patent
Trochlil et al.

(10) Patent No.: US 7,176,151 B2
(45) Date of Patent: Feb. 13, 2007

(54) LAMINATE PRODUCT, METHOD FOR MANUFACTURING, AND ARTICLE

(75) Inventors: Thomas R. Trochlil, Rhinelander, WI (US); John E. Katchko, Rhinelander, WI (US)

(73) Assignee: Wausau Paper Corp., Mosinee, WI (US)

( * ) Notice: Subject to any disclaimer, the term of this patent is extended or adjusted under 35 U.S.C. 154(b) by 401 days.

(21) Appl. No.: 10/731,736

(22) Filed: Dec. 8, 2003

(65) Prior Publication Data

US 2005/0123753 A1   Jun. 9, 2005

(51) Int. Cl.
*B32B 27/12* (2006.01)
*D04H 1/00* (2006.01)

(52) U.S. Cl. .................. 442/394; 442/327; 442/381; 156/60; 156/182; 428/913; 219/727; 219/725; 219/730; 219/759

(58) Field of Classification Search ............... 442/381, 442/394; 219/727, 725, 730, 759; 428/913; 156/60, 182
See application file for complete search history.

(56) References Cited

U.S. PATENT DOCUMENTS

| 4,548,826 A | 10/1985 | Watkins |
| 4,588,457 A * | 5/1986 | Crenshaw et al. ......... 156/62.8 |
| 4,691,374 A | 9/1987 | Watkins et al. |
| 4,878,765 A | 11/1989 | Watkins et al. |
| 4,970,358 A | 11/1990 | Brandberg et al. |
| 4,973,810 A | 11/1990 | Brauner |
| 5,044,777 A | 9/1991 | Watkins et al. |
| 5,081,330 A | 1/1992 | Brandberg et al. |
| 5,175,031 A | 12/1992 | Ochocki |
| 5,285,040 A | 2/1994 | Brandberg et al. |
| 5,338,911 A | 8/1994 | Brandberg et al. |
| 5,405,663 A | 4/1995 | Archibald et al. |
| 5,460,839 A | 10/1995 | Archibald |
| 5,461,216 A | 10/1995 | McDonald |
| 5,488,220 A | 1/1996 | Freerks et al. |
| 5,558,930 A * | 9/1996 | DiPoto ....................... 428/216 |
| 5,679,278 A | 10/1997 | Cox |
| 5,690,853 A | 11/1997 | Jackson et al. |
| 5,753,895 A | 5/1998 | Olson et al. |
| 5,994,685 A * | 11/1999 | Jackson et al. ............. 219/727 |
| 6,060,096 A | 5/2000 | Hanson et al. |
| 6,100,513 A | 8/2000 | Jackson et al. |
| 6,396,036 B1 | 5/2002 | Hanson |
| 6,913,817 B2 * | 7/2005 | Klein et al. ................. 428/323 |
| 2003/0080118 A1 | 5/2003 | Hanson |

FOREIGN PATENT DOCUMENTS

| JP | 2003-312753 | * | 6/2003 |
| WO | WO 93/15976 | | 8/1993 |
| WO | WO 03/099548 A1 | * | 12/2003 |

* cited by examiner

*Primary Examiner*—Norca L. Torres-Velazquez
(74) *Attorney, Agent, or Firm*—Merchant & Gould, P.C.

(57) ABSTRACT

The invention relates to a laminate comprising a first web of fibers and a first film that together form a first ply and a second web of fibers and a second film that together form a second ply, wherein an adhesive layer is disposed between the plies and serves as a grease barrier. A laminate according to the invention serves as a grease barrier without the need for fluorochemical treatment. The invention also relates to a method of making a laminate comprising forming a first ply and a second ply and applying an adhesive layer between the plies. The invention also relates to an article comprising a laminate and a charge of oil and popcorn.

62 Claims, 6 Drawing Sheets

LAMINATE PRODUCT, METHOD FOR MANUFACTURING, AND ARTICLE

FIELD OF THE INVENTION

The invention relates to a laminate product, a method for manufacturing a laminate product, and an article prepared from a laminate product. In particular, the laminate product is constructed to provide a desired level of grease holdout when used in contact with an oil containing food product.

BACKGROUND OF THE INVENTION

Paper products have been used for containing food. Notably, many paper products are known which are used to hold food that is heated using microwave radiation. One such application of paper products is their use in the construction of popcorn bags.

Microwave popcorn bags made from two plies of paper are available. The plies of paper typically have a weight in the range of 18 to 30 pounds per 3000 $ft^2$ of paper, and are laminated with an adhesive to form the material for the bag. Fluorochemicals are often used to alter the surface properties of the paper.

Laminate paper products are described for use as popcorn bags in, for example, U.S. Pat. No. 5,175,031 (Ochocki); U.S. Pat. No. 5,690,853 (Jackson et al.); U.S. Pat. No. 5,679,278 (Cox); U.S. Pat. No. 5,753,895 (Olson et al.); U.S. Pat. No. 5,994,685 (Jackson et al.); U.S. Pat. No. 6,100,513 (Jackson et al.); and U.S. Pat. No. 6,396,036 (Hanson).

SUMMARY OF THE INVENTION

In an embodiment, the invention relates to a laminate comprising a first ply having a first web of fibers and a first film. The first web of fibers has a weight of between 18 and 25 pounds per 3000 $ft^2$ of paper, and has a Canadian Standard Freeness of between 200 $cm^3$ and 500 $cm^3$. The laminate also comprises a second ply having a second web of fibers and a second film. The second web of fibers has a weight of between 18 and 25 pounds per 3000 $ft^2$ of paper, and also has a Canadian Standard Freeness of between 200 $cm^3$ and 500 $cm^3$. The laminate further comprises a continuous coat of an adhesive disposed between the first ply and the second ply.

The invention also relates to a method for manufacturing a laminate comprising the steps of applying an adhesive layer between a first ply and a second ply, thereby adhering the first ply and the second ply together; wherein the first ply comprises a first web of fibers having a first side and a second side, and a first film covering at least one of the first side and the second side, wherein the first web of fibers has a weight of between 12 and 45 pounds per 3000 $ft^2$ and is prepared from fibers exhibiting a Canadian Standard Freeness of between 200 $cm^3$ and 500 $cm^3$; wherein the second ply comprises a second web of fibers having a first side and a second side, and a second film covering at least one of the first side and the second side, wherein the second web of fibers has a weight of between 12 and 45 pounds per 3000 $ft^2$ and is prepared from fibers exhibiting a Canadian Standard Freeness of between 200 $cm^3$ and 500 $cm^3$.

The invention also relates to an article comprising a first ply and a second ply; wherein the first ply comprises a first web of fibers having a first side and a second side, and a first film covering at least one of the first side and the second side, wherein the first web of fibers has a weight of between 12 and 45 pounds per 3000 $ft^2$ and is prepared from fibers exhibiting a Canadian Standard Freeness of between 200 $cm^3$ and 500 $cm^3$; wherein the second ply comprises a second web of fibers having a first side and a second side, and a second film covering at least one of the first side and the second side, wherein the second web of fibers has a weight of between 12 and 45 pounds per 3000 $ft^2$ and is prepared from fibers exhibiting a Canadian Standard Freeness of between 200 $cm^3$ and 500 $cm^3$; and an adhesive layer between the first ply and the second ply, adhering the first ply and the second ply together and contacting the first film and the second film; and a charge of oil and popcorn.

DETAILED DESCRIPTION OF THE PREFERRED EMBODIMENT

A laminate product is provided by the invention. The phrase "laminate product" refers to a web of fibers that is laminated to at least another web of fibers. It should be understood that the phrase "laminate product" does not exclude the presence of other components on the surfaces of the webs of fibers. In an embodiment, the laminate product comprises a first ply and a second ply with a layer of adhesive adhering the first ply and the second ply together.

The laminate product of the invention can serve to provide a barrier to grease and oil. The laminate product of the invention can serve to provide grease hold-out or function as a barrier to grease and oil. "Grease hold-out" refers to the ability of the paper to resist penetration and/or leakage of grease and oil. This property can be measured by determining how long it takes a hydrocarbon solvent, such as turpentine, to leak through the paper product. This property can also be measured through a crease test that measures the amount of a dyed oil which leaks through the paper product over a period of time.

In an embodiment of the invention, the laminating adhesive functions as a grease barrier enhancing the grease hold-out of the laminate. The invention provides various means of preventing the laminating adhesive from absorbing into paper and thus allowing it to function as a grease barrier. For example, in an embodiment, a film can be provided over the web of fibers. As used in this description, a "film" refers to a layer on a web of fibers that prevents adhesive from absorbing into the web of fibers. As used in this description, a "continuous film" or "continuous coat" refers to a layer without gaps or holes. In another embodiment, the web of fibers may be refined, reducing the available pores and preventing the laminating adhesive from absorbing into the paper surface. In addition, combinations of these approaches may be used so that the laminating adhesive can function to enhance grease holdout.

It is expected that the desired grease holdout properties can be provided without the use of fluorochemicals. In an embodiment, the laminate of the invention does not include fluorochemicals. The laminate of the invention may contain an amount of fluorochemicals insufficient to provide the desired levels of grease hold out. The manufacture and the components of the invention will now be described in greater detail.

Manufacture of the Laminate

Figure 1:
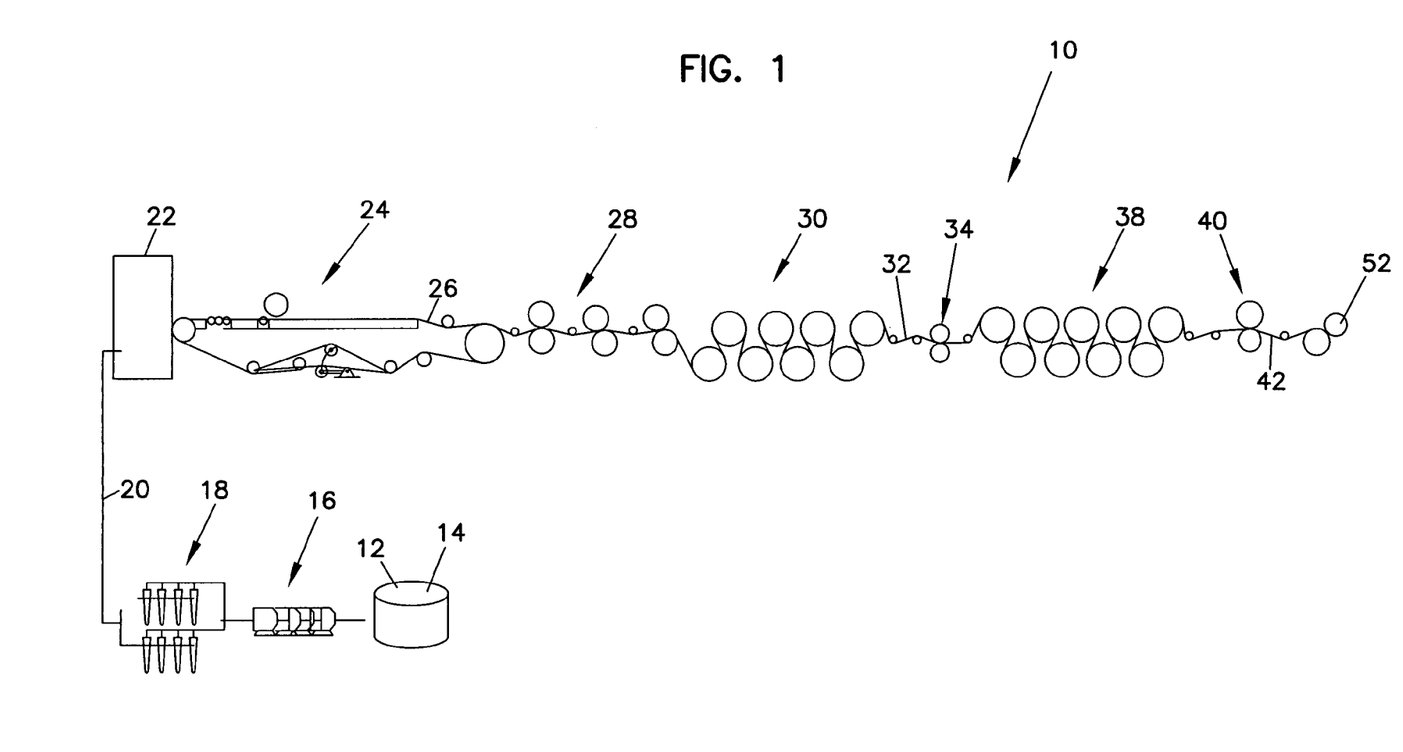
FIG. 1 is a diagrammatic view of an exemplary process for manufacturing a ply used in a laminate according to the invention.

Referring to FIG. 1, a process for making a ply used in a laminate according to the invention is shown at reference numeral 10. It should be understood that schematic diagram 10 is an exemplary schematic diagram and includes many of the operations carried out in commercial paper making facilities. The laminate of the invention comprises a first ply and a second ply. In many embodiments, the first ply and the second ply are identically made. The equipment used in a particular operation may vary from facility to facility, but it is expected that the general operations will be present.

The starting material 12 generally includes wood pulp 14. The wood pulp can include a blend of hard wood and soft wood fibers. The wood pulp can be provided as cellulose fiber from chemical pulped wood, and can include a blend from coniferous and deciduous trees. By way of example, the fibers can be from Northern hardwood, Northern softwood, Southern hardwood, or Southern softwood. Hardwood fibers tend to be more brittle but are generally more cost effective for use because the yield for pulp from hardwood is higher than the yield for pulp from softwood. Softwood fibers have better characteristics but are more expensive. Blends of hardwood and softwood fibers are frequently used. In an embodiment, a fiber blend of about 87% Northern softwood and 13% Northern hardwood is used. The fibers can also be bleached or unbleached. The wood pulp 14 can be processed through a refining operation 16 and through a cleaning operation 18. The cleansed pulp 20 is then applied through a head box 22 onto a fourdrinier machine 24 to provide a paper base sheet 26. Certain additives can be added prior to the head box 22 and this is referred to as "wet end chemistry."

Wet end additives can be provided for sizing, strength, opacity, water resistance, and/or oil resistance. Exemplary water resistance additives include rosin and alkylketene dimer (AKD). Exemplary strength additives include urea formaldehyde and polyamide. Exemplary opacifying additives include kaolin clays, titanium dioxide, and calcium carbonate. Other components, such as defoaming agents, pitch dispersants, dyes, etc. may also be added prior to the head box 22.

The paper base sheet 26 can be characterized as continuous in the machine direction. The paper base sheet 26 can be processed through a wet press section 28 to remove water, and then through a drier section 30 to further reduce the water content and provide a web of fibers 32. The web of fibers 32 can be dried to a moisture level of between about 0.5 wt. % to about 5 wt. %.

The web of fibers 32 is processed through a size press 34 for the application of a surface treatment. Certain additives can be added to the size press solution. Size press additives can be provided for sizing, strength, to close up the surface of the sheet (film formers), to fill in the surface of the sheet, for water resistance, and/or oil resistance. Exemplary water resistance additives include alkyl ketene dimmer (AKD), styrene maleic anhydride (SMA), and waxes. Exemplary fillers include kaolin clays, titanium dioxide, and calcium carbonate. Plasticizers may also be added at the size press 34. Plasticizers include humectants and can function to keep paper soft and make it less likely that the paper will fracture. Suitable plasticizers include urea, nitrates, glycerine, and saccharides (such as NEOSORB®, available from Roquette Corp., Gurnee, Ill.). In many embodiments, a film forming solution is applied to the web of fibers 32 at the size press to form a ply of paper product.

There are also other means of applying components besides applying them at the size press 34. Other application technologies including a metering film size press, roll coaters, and blade coaters may also be used to apply components to the web of fibers 32.

The treated ply is then dried in a second drier section 38 and calendered in a machine calender 40 to provide a calendered ply 42. The ply 42 can then be sent to a winder and put on a roll 52. When put on a roll 52, the paper substrate 42 can be referred to as roll stock.

At this point, the roll stock can be sold and/or shipped to a converter for processing or can simply be fed into a further line for processing. Processing of the roll stock may include the conversion of the plies into a laminate. Processing of the roll stock may also include converting the laminate into an article such as a container or bag. Processing may include folding, creasing, applying adhesive, applying a susceptor patch, heat sealing, and other steps for turning the plies or laminate into the desired article.

Figure 2:
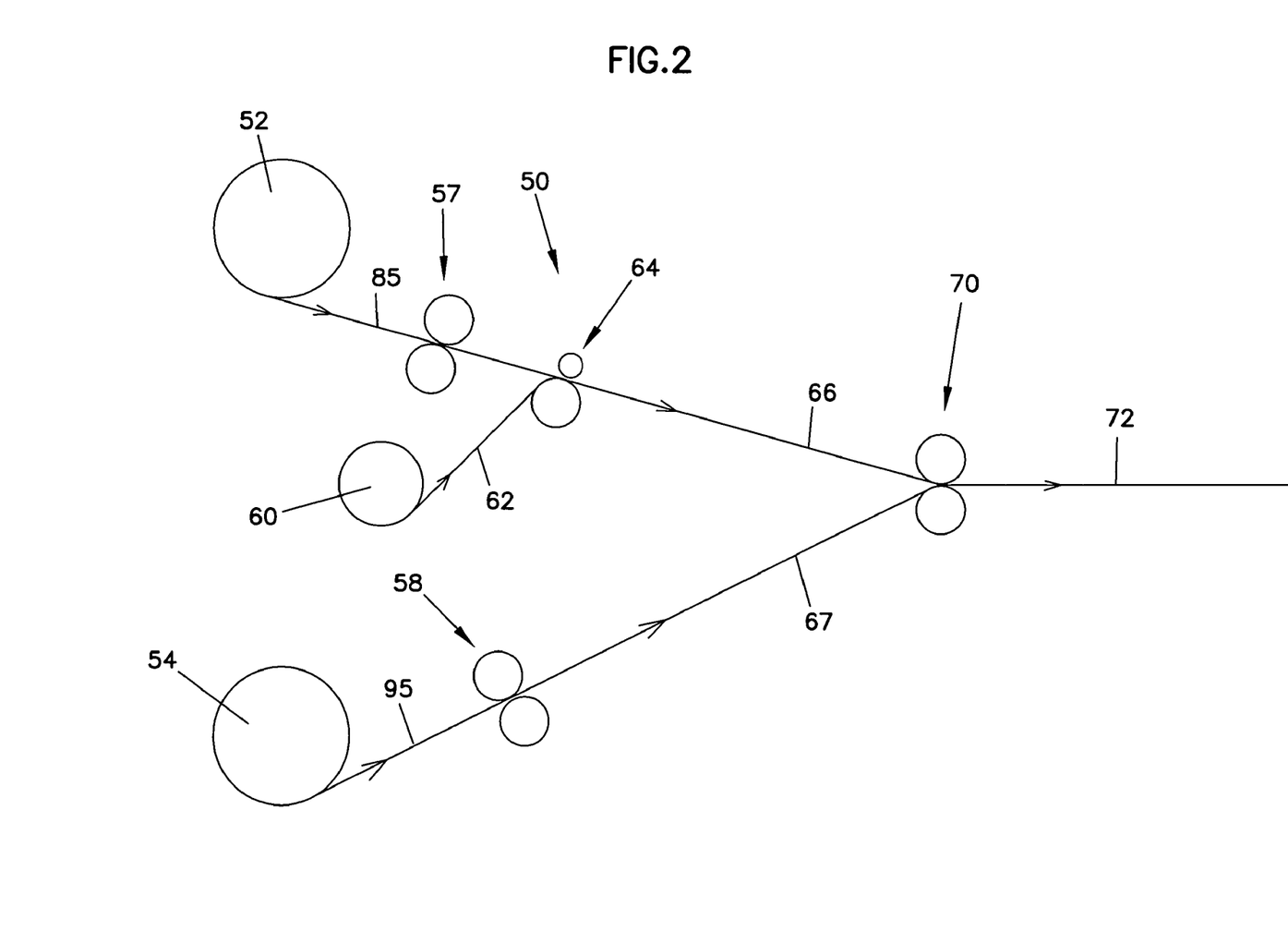
FIG. 2 is a diagrammatic view of an exemplary process for creating a laminate from plies according to the invention.
Figure 3:
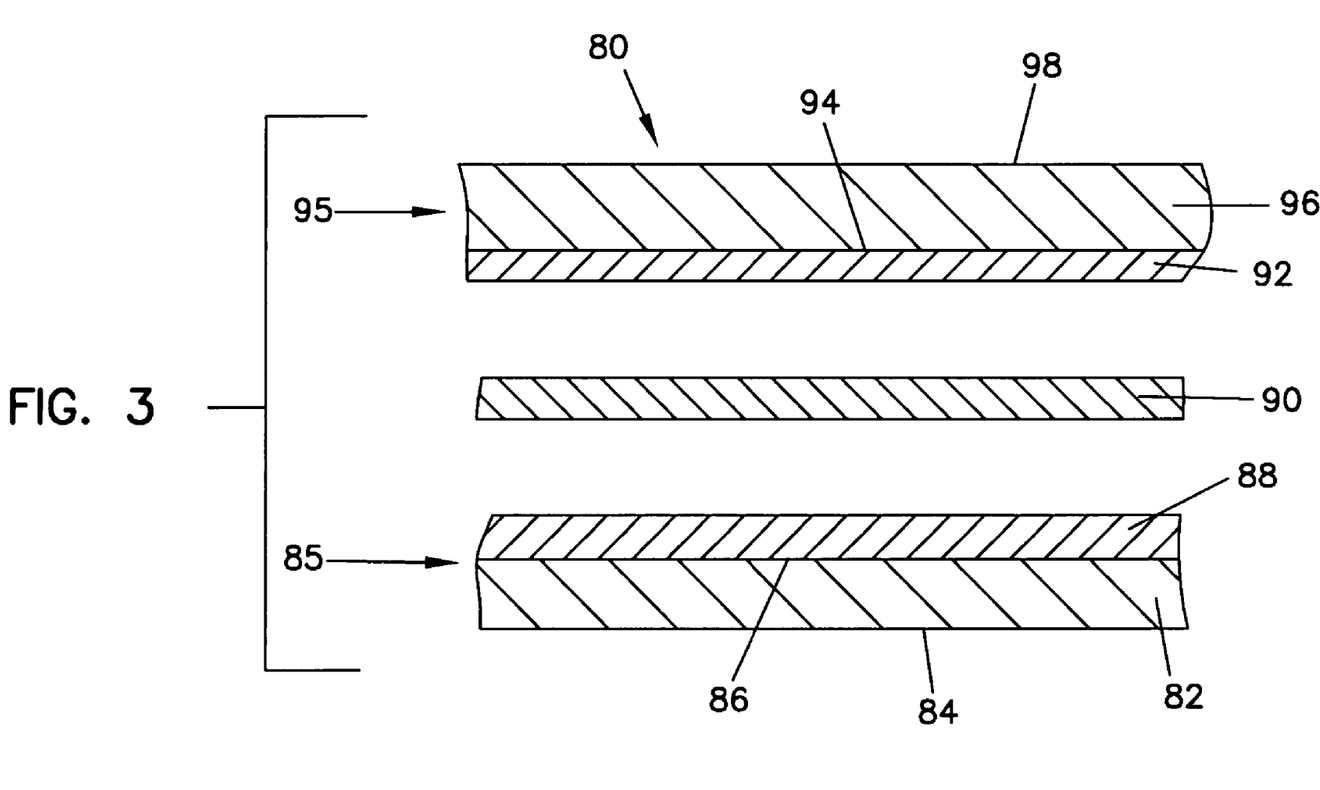
FIG. 3 is an exploded cross-sectional view of a laminate in accordance with one embodiment of the invention.
Figure 4:
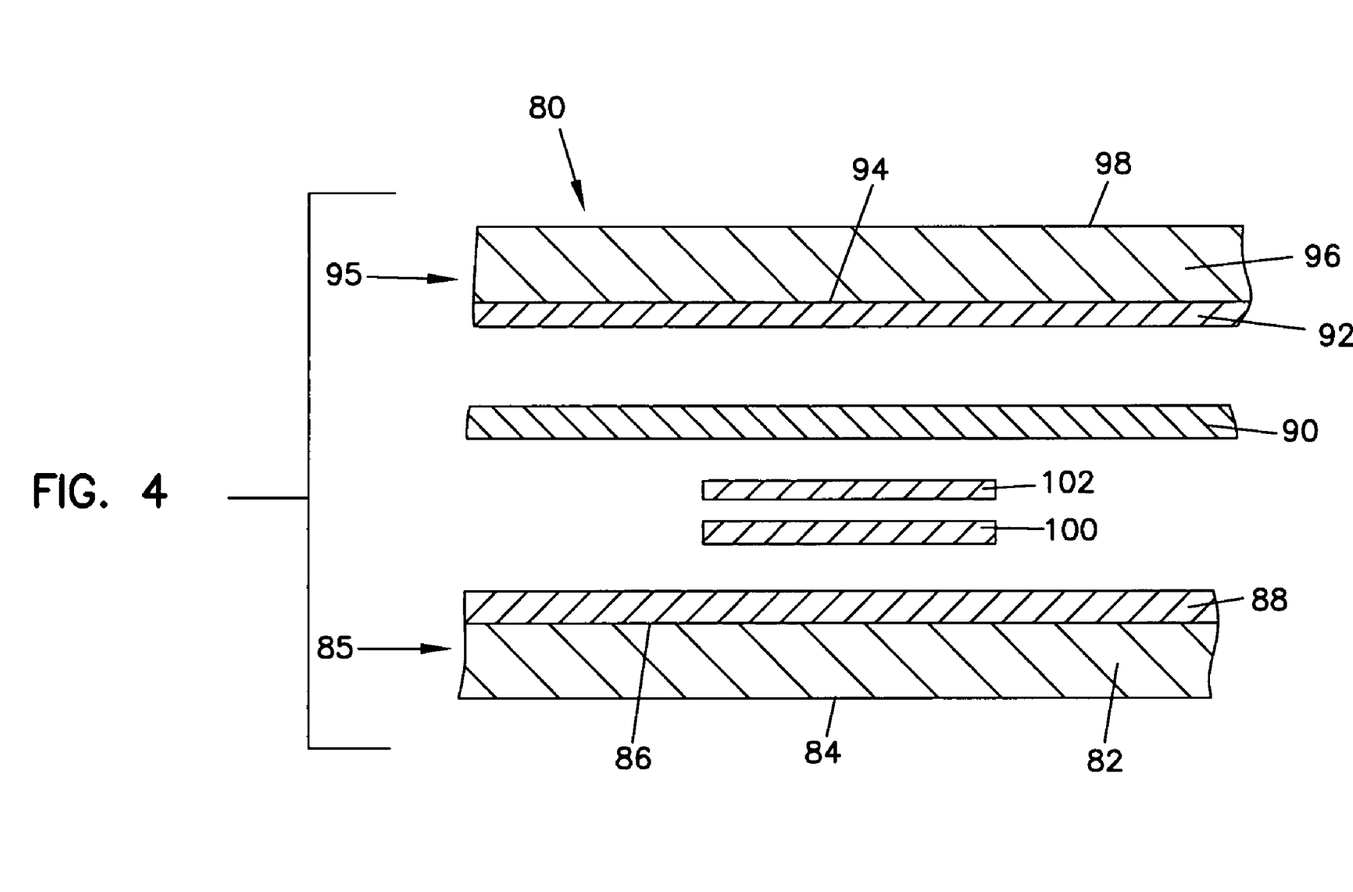
FIG. 4 is an exploded cross-sectional view of a laminate in accordance with a second embodiment of the invention.
Figure 5:
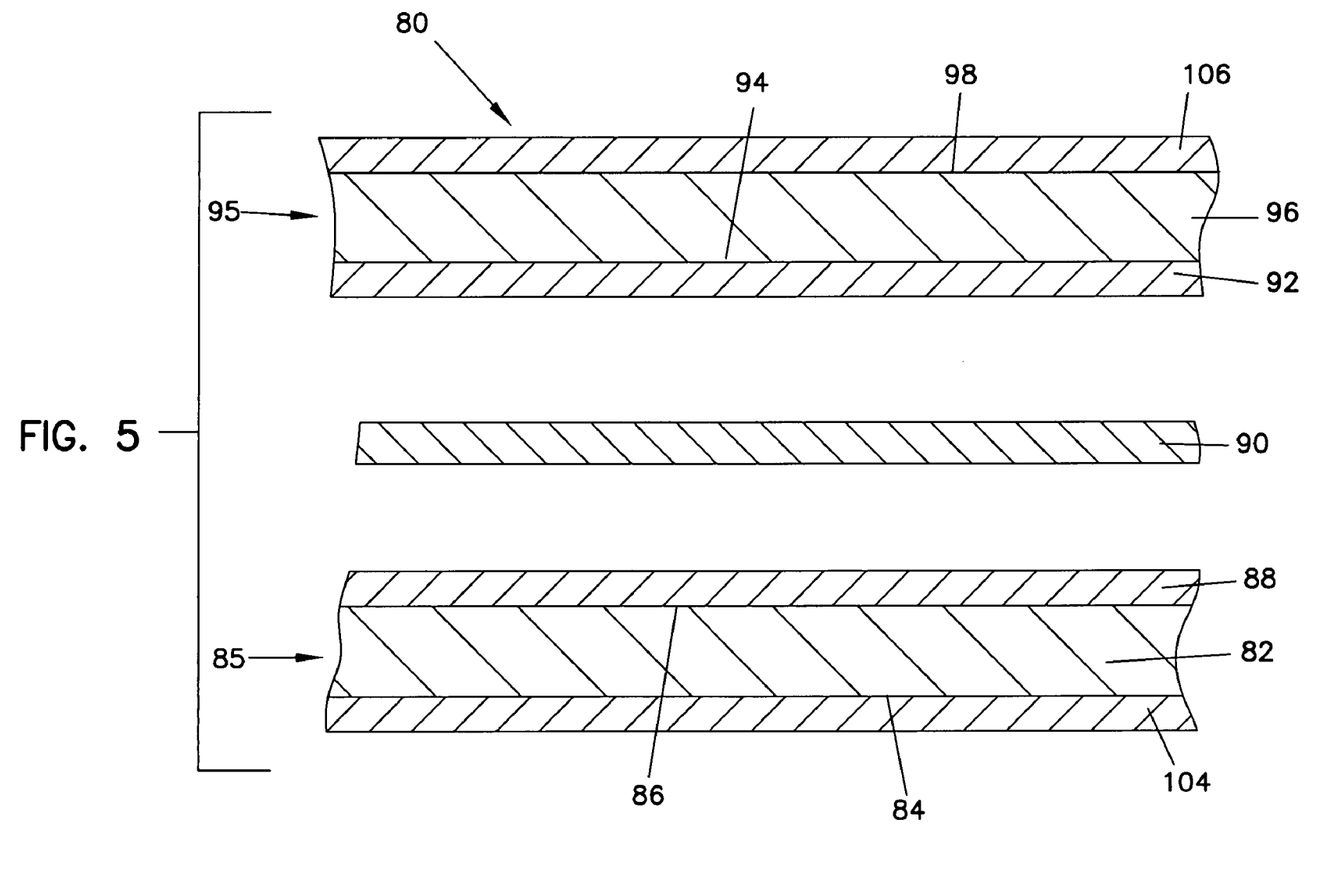
FIG. 5 is an exploded cross-sectional view of a laminate in accordance with a third embodiment of the invention.

Referring to FIG. 2, a diagrammatic view is shown of an exemplary process for creating a laminate from individual plies according to the invention. In FIG. 2, the first ply 85 is first unwound from a roll 52 before receiving a layer of adhesive 100 (as shown in FIG. 4) from an applicator 57. The susceptor material 62 is unwound from a roll 60 before being cut and applied to the first ply 85 by a nipping roller 64 to form a component 66 that is ready to be laminated. Simultaneously, the second ply 95 is unwound from a roll 54 before receiving a layer of adhesive 90 (as shown in FIGS. 3–5) from an applicator 58 to form a second component 67 that is ready to be laminated. Components 66 and 67 are then fed into a nipping roller 70 forming a laminate 72 according to the invention. The laminate is then wound onto a roll or cut and folded into a bag (not shown).

In some embodiments, the paper product is provided to bag converters as a laminate for further processing. In other embodiments, the plies of paper with film layers are provided separately and the bag converter laminates the plies together as a part of further processing.

Web of Fibers

Refining is the treatment of pulp fibers to develop their papermaking properties. Refining increases the strength of fiber to fiber bonds by increasing the surface area of the fibers and making the fibers more pliable to conform around each other, which increases the bonding surface area and leads to a denser sheet, with fewer voids. Most strength properties of paper increase with pulp refining, since they rely on fiber to fiber bonding. The tear strength, which depends highly on the strength of the individual fibers, actually decreases with refining. Refining of pulp increases the fibers flexibility and leads to denser paper. This means bulk, opacity, and porosity decrease (porosity values increase) with refining. Fibrillation is a result of refining paper fibers. Fibrillation is the production of rough surfaces on fibers by mechanical and/or chemical action; refiners break the outer layer of fibers, i.e., the primary cell wall, causing the fibrils from the secondary cell wall to protrude from the fiber surfaces.

The extent to which a paper product is made with refined fibers can be measured through several means. One type of testing for refined fibers is referred to as freeness testing. In this mode of testing, the speed with which water drains through a sample web of fibers is measured. Because paper made with highly refined fibers has fewer voids and small holes, it takes water longer to drain through a sheet of paper made with highly refined fibers. A standard for this mode of testing is the Canadian Standard Freeness (CSF) test. The CSF test was developed for use with groundwood pulps and was not intended for use with chemical pulps; nevertheless, it is the standard test for monitoring refining in North American mills. TAPPI (Technical Association of the Pulp and Paper Industry) standard test T 227 corresponds to the CSF test. Another common test of the refined nature of paper is the Shopper Riegler test, which is similar in concept to the CSF test.

Paper that is refined is more resistant to oil and grease penetration. It is believed that this is because there are fewer voids and holes the more the fibers of a web are refined. Refining the fibers may be desired to generate a fiber with a higher level of refinement. In an embodiment, the first ply and the second ply are made with webs of fibers that have a freeness of less than 500 $cm^3$. Refining tends to reduce the tear strength of paper as well as reducing opacity. Using paper that is more refined than necessary may also be uneconomical. In an embodiment, the first ply and the second ply are made with webs of fibers that have a freeness of greater than 200 $cm^3$. In some embodiments, the first ply and the second ply are made with webs of fibers having a freeness of between 200 $cm^3$ and 500 $cm^3$ according to the TAPPI Canadian Standard Freeness test. In a particular embodiment, the first ply and the second ply are made with a web of fibers having a freeness of 325 $cm^3$. The second ply may be made with paper that is the same as the first ply. This provides advantages in terms of handling and inventory management. The second ply may also be different than the first ply.

Most standard paper machines do not handle paper with a low weight. By way of example, most standard paper machines do not handle paper with a weight of less than about 18 pounds per 3000 $ft^2$ of paper. In embodiment, the web of fibers of the first ply and the second ply is greater than about 12 pounds per 3000 $ft^2$ of paper. The use of paper that is heavier than necessary may be uneconomical. In an embodiment, the web of fibers of the first ply and the second ply is less than about 45 pounds per 3000 $ft^2$ of paper. The web of fibers of the first ply and the second ply may be in the range of about 12 to about 45 pounds per 3000 $ft^2$ of paper. In an embodiment, the web of fibers of the first ply and the second ply may also be in the range of 18 to 25 pounds per 3000 $ft^2$ of paper.

The web of fibers is generally made with fibers from wood pulp. The wood pulp can be provided as cellulose fiber from chemical pulped wood, and can include a blend from coniferous and deciduous trees. By way of example, the fibers can be from Northern hardwood, Northern softwood, Southern hardwood, or Southern softwood. Hardwood fibers tend to be more brittle but are generally more cost effective for use because the yield for pulp from hardwood is higher than the yield for pulp from softwood. Softwood fibers have better characteristics but are more expensive. Blends of hardwood and softwood fibers are frequently used. In an embodiment, a fiber blend of about 87% Northern softwood and 13% Northern hardwood is used. The fibers can also be bleached or unbleached.

In some embodiments, the plies of paper used should not be too transparent, as the contents of the popcorn bag would be visible before popping. In order to prevent the paper from being too transparent, various components can be added to make the paper more opaque. As one example, amounts of titanium dioxide can be added to the paper to make the paper more opaque. Other examples of potential additives include kaolin clays and calcium carbonate.

Generally, paper food containers, and popcorn bags in specific, have graphic printing visible from the outside. In some embodiments, the plies of paper may have their surface treated in such a way so as to enhance the print characteristics. This may include the use of a film former, such as starch, to smooth the paper surface for uniform ink acceptance. The paper could also be calendered to smooth the paper surface, improving the final print.

Film Layer

"Size press chemistry" refers to the circumstance whereby various additives are added to the size press and then applied to the paper. In embodiments of the present invention, a film forming solution is provided at the size press to the exterior of a given ply of paper to create a film. The film should be appropriate for contact with food, should adhere to the paper sufficiently under the conditions of use, and should adhere to the laminating adhesive under conditions of use.

The film layer is believed to function by preventing the laminating adhesive from absorbing into the web of fibers. When dried, the film can promote the formation of a continuous film of laminating adhesive that can function as a grease barrier. Accordingly, in an embodiment, a film former is applied as a continuous film onto the web of fibers. A "continuous film" or a "continuous coat" refers to a layer without gaps or holes.

The film layer may be applied to one side, or to both sides, of the first and second plies of paper. In FIG. 3, an exploded cross-sectional view of a laminate 80 is shown in accordance an embodiment of the invention wherein a film layer is applied to only one side of each ply of paper. There is a first web of fibers 82 and a second web of fibers 96. The first web of fibers 82 has a first surface 84 and a second surface 86. There is a first film 88 covering the second surface 86 of the first layer 82. The first web of fibers 82 and the first film 88, together, form the first ply 85. The second web of fibers 96 also has a first surface 94 and a second surface 98. There is a second film 92 covering the first surface 94 of the second web of fibers 96. The second web of fibers 96 and the second film 92, together, form the second ply 95. There is a continuous coat of adhesive 90 that is disposed between the first ply 85 and the second ply 95. The coat of adhesive 90 serves to enhance grease holdout, thereby preventing oil from passing through into the second ply 95. Applying a film to only one side of each web of fibers is easier for the production of paper and is more cost efficient. However, only having a film on one side of each ply of paper means that care must be taken to keep the side of the paper with the film distinguished from the side of the paper without the film. This is because where a film is applied to only one side of each web of fibers, the side with the film is the side that contacts the laminating adhesive. Ensuring that the sides are not confused can be accomplished by careful handling of the paper or through other methods such as the application of a dye to one side of the paper.

Alternatively, applying a film to both sides of each web of fibers may result in a paper product with improved grease barrier characteristics. Referring now to FIG. 5, an exploded cross-sectional view of a laminate 80 in accordance with an embodiment of the invention is shown where a film is applied to both sides of each web of fibers. In this embodiment there are film layers on both sides of both the first web of fibers 82 and the second web of fibers 96. The first web of fibers 82 has a first surface 84 and a second surface 86. There is a first film 88 covering the second surface 86 of the first web of fibers 82 and a third film 104 covering the first surface 84 of the first web of fibers 82. In this embodiment, the web of fibers 82, the first film 88, and the third film 104 form the first ply 85. The second web of fibers 96 also has a first surface 94 and a second surface 98. There is a second film 92 covering the first surface 94 of the second web of fibers 96 and a fourth film 106 covering the second surface 98 of the second web of fibers 96. In this embodiment, the web of fibers 96, the second film 92, and the fourth film 106 form the second ply 95. There is a continuous coat of adhesive 90 that is disposed between the first ply 85 and the second ply 95.

Many types of film forming solutions are contemplated by the present invention. The film forming solution used should serve to prevent the adhesive from absorbing into the plies of paper and should be compatible with food. Suitable film forming solutions can include oxidized starches, ethylated starches, cationic starches, unmodified starches, starch based adhesives, proteins, synthetic resins, polyvinyl acrylates, polyvinyl acetate, polyvinyl alcohol, polyvinylalcohol based adhesives, vinyl acetate acrylic, styrene acrylates, vinyl acetate, ethylene vinyl acetate, styrene maleic anhydride as well as viscosity modifiers such as sodium alginate, sodium carboxymethyl cellulose, hydroxyl ethyl cellulose, poly sodium acrylate, guar gum, gum arabic, xanthan gum, or combinations thereof. One of skill in the art will appreciate that starches can be natural (corn, wheat, potato, tapioca, etc.) or synthetic. By way of further example, ethylated starch is available from Penford Products Co., 1001 First Street S. W., Cedar Rapids, Iowa 52404.

In an embodiment of the invention, the film forming solution is a combination of starch and alginate. The combination of starch and alginate is known to be compatible with food and can also be printed on. Alginate is a natural polysaccharide produced from seaweed, which is soluble in cold or hot water. Starch and alginate are both commercially available. One type of alginate used is sodium alginate sold as SNP S-500-C and is available from Synthetic Natural Polymers (SNP), PO Box 11575, Durham, N.C. 27703.

Laminating Adhesive

As used herein, the term "adhesive" refers to where a particular compound is functioning to adhere a first ply to a second ply, or a susceptor patch to a first ply or a second ply. Generally, the laminating adhesive as used in embodiments of the invention should be suitable for contact with food according to FDA standards. As microwaves reach high temperatures, e.g. 450° F. or greater, the laminating adhesive should be one that does not break down at these high temperatures into compounds that would be unsuitable for food uses. Moreover, the adhesive should retain sufficient strength at ambient and high cooking temperatures so that the bag retains sufficient structural integrity.

Many different types of laminating adhesive can be used in accordance with the invention. Suitable laminating adhesives include polyvinylacetate (PVA), ethylenevinylacetate (EVA), starch based adhesives, synthetic resins, and polyvinyl alcohol based adhesives. In an embodiment of the invention, the laminating adhesive used is polyvinylacetate. For example, NATIONAL 33-9138 sold by National Starch and Chemical Co., 3405 Commerce Court, Appleton, Wis. 54911, is a suitable adhesive for laminating the plies together. The laminating adhesive may also be mixtures of different types of adhesives. In some embodiments, the laminating adhesive is applied in a coat of between 1 pound per 3000 $ft^2$ of paper to 10 pounds per 3000 $ft^2$ of paper. In other embodiments, the laminating adhesive is applied in a coat of between 4 pounds per 3000 $ft^2$ of paper to 8 pounds per 3000 $ft^2$ of paper. In a particular embodiment, the laminating adhesive is applied is a coat of 6 pounds or about 6 pounds per 3000 $ft^2$ of paper. Other amounts of laminating adhesive may also be used.

The application of the laminating adhesive is dependent on the requirements of the converter. The laminating adhesive could be applied with a flexographic applicator, rotogravure, roll coater, or other aqueous application methods. The laminating adhesive is generally applied as a continuous layer on the film.

Grease Holdout Tests

One of skill in the art will appreciate that the ability of a paper product to provide grease holdout can be tested in many ways. For example, a standard procedure for this test is described by the TAPPI turpentine test for voids in glassine and greaseproof papers (TAPPI test T 454 om-94). The results of this test are measured in terms of how many minutes it takes before any turpentine starts to show through the paper product. In an embodiment of the invention, the laminate of the invention resists turpentine showing through the paper product for greater than 180 minutes.

Grease hold out can also be measured through what is known as crease testing, or a RP-2 fat test. The procedure for crease testing is as follows: 1.) age a sample in a humidity room (50% RH/73° F.) for two hours; 2.) cut the sample into 4"×4" squares; 3.) lay the sample on a glass plate and fold in half then lightly crease the fold with a finger using light pressure, then roll a rubber roller over the crease, then unfold the sample and roll the rubber roller back over the crease, then fold a new crease perpendicular to the first but with the reverse side inward, lightly crease with a finger and roll the rubber roller over the crease, then unfold and roll the rubber roller back over the crease; 4.) place a grid printed sheet on top of a back sheet and then place on a backup board; 5.) place a creased sample on the grid; 6.) place a metal ring on each sample; 7.) place 5 grams of sand onto each sample; 8.) add 1.3 cc of 60° C. RP-2 oil (RP-2 oil is available from Ralston Purina Co.), to each sand pile; 9.) place samples in a 60° C. oven for 24 hours; 9.) remove samples from oven and examine grid sheets; 10.) grade the amount of stain on the grid printed sheet where each grid square is equal to 1%. The grading standard is as follows: each grid square that is 7.00% or more stained counts as 1% of the total; each grid square that is from 1.00% to 7.00% stained counts as 0.5% of the total; each grid square that is 0.25% to 1.00% stained counts as 0.25% of the total; each grid square that has a few specks to 0.25% stained counts as 0.1% of the total. After visually assessing each grid square a total percentage for the sample sheet can be calculated. When the total amount of stain is in the range of 1.0% to 7.0%, the number is rounded up to the nearest 0.5%. The average of four creased samples is determined to be the percentage for the sample. 0.0% would represent absolutely no oil leaking through. 100.00% would represent a complete failure with the entire grid being covered. An amount of oil leaking through greater than 2.00% can be considered undesirable. In an embodiment, the laminate of the invention has a leak through of less than about 2.00%. The laminate of the invention may also have a leak through of less than about 0.25%.

The ability of a paper product to function as a grease barrier specifically for popcorn bags can also be tested in various ways. One test is to fill a bag made from the paper product with oil and then put it in an oven maintaining a temperature of 100° F. The results of this test are measured by how long it takes before oil passes through the paper bag. A second test is simply to pop corn and see if any oil leaks through.

Susceptor Patch

In some embodiments, the laminate may also include a susceptor patch. A susceptor patch is sometimes used because it is believed to aid in functioning of a bag for microwave heating by interacting with the microwave radiation and acting as a focal point for heat generation. The susceptor patch may be constructed from a 48-gauge or 0.5 mil metallized polyester film, vacuum deposited metal, carbon or metallic based coatings, laminates, inks or print, other microwave interactive material(s), or any combination thereof. Exemplary susceptor patches are disclosed in U.S. Pat. No. 6,586,715 (Watkins), U.S. Pat. No. 6,137,098 (Moseley et al.), and U.S. Pat. No. 5,614,259 (Yang et al.), the disclosures of which are herein incorporated by reference. The susceptor could also be a lower temperature patch (a "safety" susceptor) allowing for direct contact between the susceptor patch and the popcorn oil or popcorn.

The susceptor patch may be affixed to other components of the laminate with a susceptor patch adhesive. Suitable adhesives include polyvinylacetate (PVA), ethylenevinylacetate (EVA), starch based adhesives, synthetic resins, and polyvinyl alcohol based adhesives. In an embodiment of the invention, the laminating adhesive used is ethylenevinylacetate (EVA). One example of a suitable adhesive for laminating the susceptor patch to the single ply paper is NATIONAL 33-9138 sold by National Starch and Chemical Co., 3405 Commerce Court, Appleton, Wis. 54911.

Referring now to FIG. 4, an exploded cross-sectional view of a laminate 80 in accordance with a second embodiment of the invention having a susceptor patch is shown. There is a first web of fibers 82 and a second web of fibers 96. The first web of fibers 82 has a first surface 84 and a second surface 86. There is a first film 88 covering the second surface 86 of the first web of fibers 82. In this embodiment, the first web of fibers 82 and the first film 88, together, comprise the first ply 85. In the embodiment of FIG. 4, there is a susceptor patch 102 that is adhered to the first film 88 with an adhesive 100. The second web of fibers 96 also has a first surface 94 and a second surface 98. There is a second film 92 covering the first surface 94 of the second web of fibers 96. In this embodiment, the second web of fibers 96 and the second film 92, together, comprise the second ply 95. There is a continuous coat of adhesive 90 that is disposed between the first ply 85 and the second ply 95. The coat of adhesive 90 serves to hold out grease, thereby preventing oil from passing through into the second ply 95. While the susceptor patch 102 is shown between the first film 88 and the continuous coat of adhesive 90, one of skill in the art will appreciate that it can be positioned in many different areas. For example, the susceptor patch 102 could be positioned between the second film 92 and the continuous coat of adhesive 90. The susceptor patch 102 could also be on the first surface 84 of the first web of fibers 82 or on the second surface 98 of the second web of fibers 96. The susceptor patch 102 could also be between the first web of fibers 82 and the first film 88, or between the second web of fibers 96 and the second film 92.

Applications of the Laminate

One of skill in the art will appreciate that the invention has many applications. For example, it may be used in the formation of bags or containers to hold various food products including: popcorn, french fries, pizza, frozen dinners, and many others. The invention may also be used in non-food applications where grease hold-out is a requirement, such as tubes for holding lubricating oils or greases. Similarly, the invention can be used to form containers for holding metal parts that are shipped with grease pre-applied.

Paper products for use in food applications have certain requirements. The paper, when used for making a bag, should have the necessary strength requirements to allow for the bag converting process, the filling process, and finally end-use by the customer. In the context of paper products used for popcorn bags, the paper product should be opaque enough for print requirements and to hide the popcorn oil and popcorn. The paper should also have the necessary stiffness to allow for filling on the popcorn equipment lines. Finally, the paper product should be oil resistant so as to prevent oil from leaking through the paper both during storage of the un-popped product and during popping of the corn.

The oil used with microwave popcorn is typically filled into the bag as a liquid, then solidifies as it cools. As the food is heated up for popping, the oil once again becomes a liquid. The temperature of the oil can be higher than 450° F.

The ability of a paper product to function as a grease barrier can be tested in various ways. One test is to fill a bag made from the paper product with oil and then put it in an oven maintaining a temperature of 100° F. The results of this test are measured by how long it takes before oil passes through the paper bag. A second test is simply to pop corn and see if any oil leaks through. A third test is to determine how long it takes a hydrocarbon solvent, such as turpentine, to leak through the paper bag. In addition to preventing oil from leaking through the paper, materials from the paper product should not migrate into the oil under the conditions of use. In an embodiment of the invention, a laminate is provided that can used to make a popcorn bag that meets the above criteria.

Figure 6:
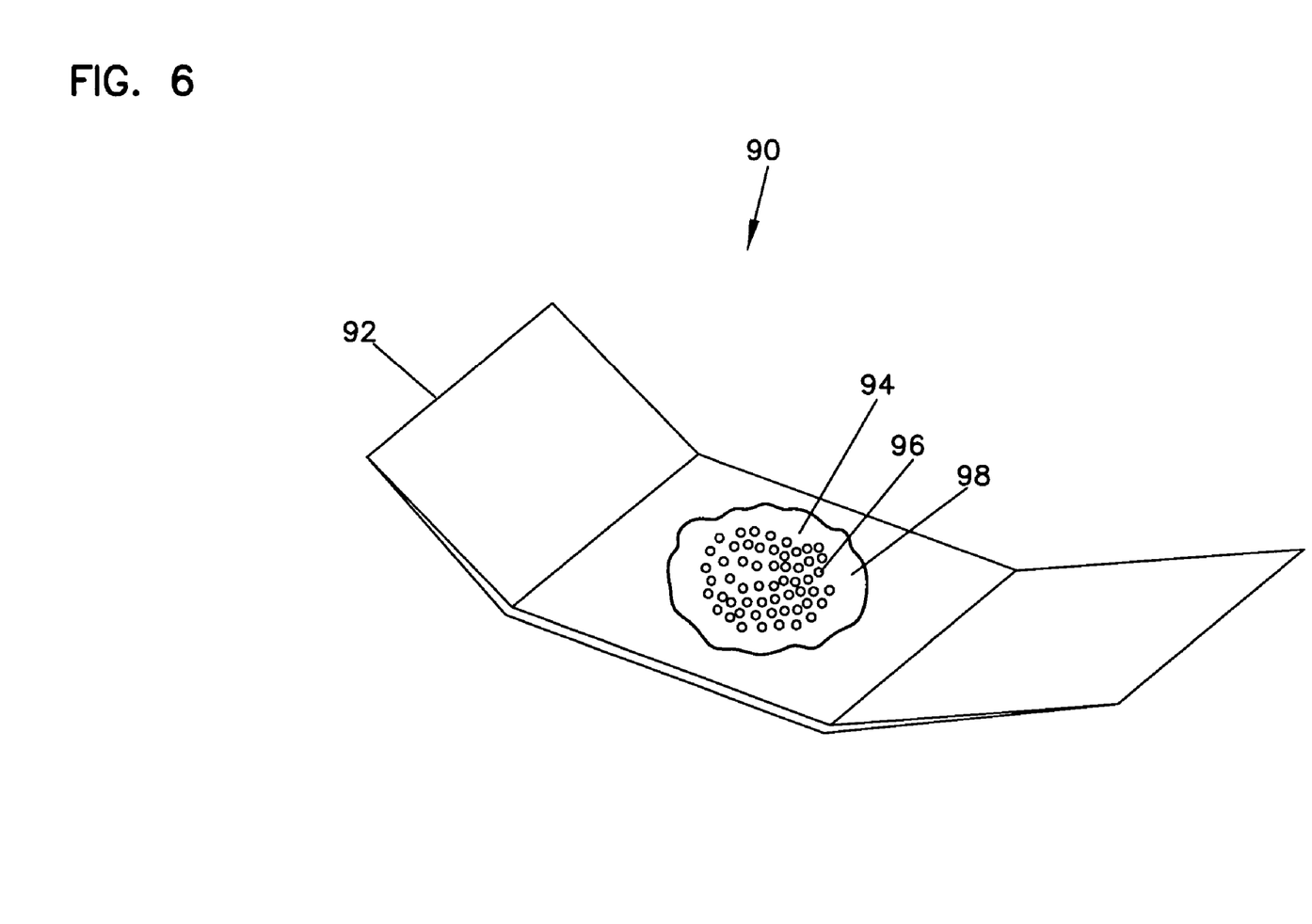
FIG. 6 is a perspective view of an embodiment of the invention in the form of a bag with a popcorn and oil charge.

In embodiments of the invention used as popcorn bags, the invention may be formed into a bag that may contain a charge of popcorn and oil. The oil may be either a liquid or a solid. The charge may also comprise other components such as flavorings (butter, salt, etc.) and preservatives. Referring now to FIG. 6, a trifold popcorn bag in an unpopped state 90 is shown made from a laminate 92 of the invention. The popcorn bag 90 contains a charge 94 comprising popcorn 96 and oil 98.

The above specification provides a complete description of the manufacture and use of the composition of the invention. Since many embodiments of the invention can be made without departing from the spirit and scope of the invention, the invention resides in the claims hereinafter appended.

We claim:

1. A laminate comprising:
   (a) a first ply comprising a first web of fibers having a first side and a second side, and a first film covering at least one of the first side and the second side, wherein the first web of fibers:
      (i) has a weight of between 12 and 45 pounds per 3000 ft$^2$; and
      (ii) is prepared from fibers exhibiting a Canadian Standard Freeness of between 200 cm$^3$ and 500 cm$^3$;

(b) a second ply comprising a second web of fibers having a first side and a second side, and a second film covering at least one of the first side and the second side, wherein the second web of fibers has:
  (i) a weight of between 12 and 45 pounds per 3000 ft$^2$; and
  (ii) is prepared from fibers exhibiting a Canadian Standard Freeness of between 200 cm$^3$ and 500 cm$^3$; and
(c) adhesive adhering the first ply to the second ply, wherein the adhesive contacts the first film and the second film.

2. A laminate according to claim 1, wherein the first web of fibers and the second web of fibers comprise cellulose fiber from chemical pulped wood comprising at least one of coniferous and deciduous trees.

3. A laminate according to claim 1, wherein the first web of fibers and the second web of fibers comprise cellulose fiber from chemical pulped wood comprising at least one of hardwood and softwood.

4. A laminate according to claim 1, wherein the first web of fibers and the second web of fibers comprise bleached cellulose fiber.

5. A laminate according to claim 1, wherein the first web of fibers has a weight of between about 18 lbs./3,000 ft.$^2$ and about 25 lbs./3,000 ft.$^2$.

6. A laminate according to claim 1, wherein the second web of fibers has a weight of between about 18 lbs./3,000 ft.$^2$ and about 25 lbs./3,000 ft.$^2$.

7. A laminate according to claim 1, wherein the first web of fibers and the second web of fibers have a Canadian Standard Freeness of about 325 cm$^3$.

8. A laminate according to claim 1, wherein the first ply and the second ply are the same.

9. A laminate according to claim 1, wherein the first film and the second film are formed from a solution containing at least one of oxidized starches, ethylated starches, cationic starches, unmodified starches, starch based adhesives, proteins, synthetic resins, polyvinyl acrylates, polyvinyl acetate, polyvinyl alcohol, polyvinylalcohol based adhesives, vinyl acetate acrylic, styrene acrylates, vinyl acetate, ethylene vinyl acetate, styrene maleic anhydride, sodium alginate, sodium carboxymethyl cellulose, hydroxyl ethyl cellulose, polysodium acrylate, guar gum, gum arabic, and xanthan gum.

10. A laminate according to claim 1, wherein the first film and the second film are formed from a solution comprising starch and sodium alginate.

11. A laminate according to claim 1, further comprising a third film disposed on the opposite side of the first web of fibers as the first film.

12. A laminate according to claim 1, further comprising a fourth film disposed on the opposite side of the second web of fibers as the second film.

13. A laminate according to claim 1, wherein the adhesive comprises at least one of polyvinylacetate, ethylenevinylacetate, starch based adhesives, synthetic resins, and polyvinyl alcohol based adhesives.

14. A laminate according to claim 13, wherein the adhesive is polyvinylacetate.

15. A laminate according to claim 1, wherein the adhesive has a weight of between 4 lbs./3,000 ft$^2$ and 8 lbs./3,000 ft$^2$.

16. A laminate according to claim 1, wherein the adhesive is effective to holdout grease.

17. A laminate according to claim 1, wherein the laminate resists turpentine according to TAPPI test T 454 om-94 for longer than 180 minutes.

18. A laminate according to claim 1, wherein the laminate has less than 2.00% oil pass-through according to crease testing.

19. A laminate according to claim 18, wherein the laminate has less than 0.25% oil pass-through according to crease testing.

20. A laminate according to claim 1, wherein the laminate is provided in a roll.

21. A laminate according to claim 1, further comprising a susceptor patch.

22. A laminate according to claim 1, wherein the laminate does not contain a fluorochemical component.

23. A method for manufacturing a laminate comprising the steps of:
  (a) applying an adhesive layer between a first ply and a second ply, thereby adhering the first ply and the second ply together; wherein the first ply comprises a first web of fibers having a first side and a second side, and a first film covering at least one of the first side and the second side, wherein the first web of fibers has a weight of between 12 and 45 pounds per 3000 ft$^2$ and is prepared from fibers exhibiting a Canadian Standard Freeness of between 200 cm$^3$ and 500 cm$^3$; wherein the second ply comprises a second web of fibers having a first side and a second side, and a second film covering at least one of the first side and the second side, wherein the second web of fibers has a weight of between 12 and 45 pounds per 3000 ft$^2$ and is prepared from fibers exhibiting a Canadian Standard Freeness of between 200 cm$^3$ and 500 cm$^3$, wherein the adhesive contacts the first film and the second film.

24. A method for manufacturing a laminate according to 23, further comprising the steps of:
  (a) forming the first web of fibers;
  (b) applying the first film to the first web of fibers to create the first ply; wherein the first film is formed from a solution comprising starch and alginate;
  (c) forming the second web of fibers; and
  (d) applying the second film to the second web of fibers to create the second ply; wherein the second film is formed from a solution comprising starch and alginate.

25. A method according to claim 23, wherein the first web of fibers and the second web of fibers comprise cellulose fiber from chemical pulped wood comprising at least one of coniferous and deciduous trees.

26. A method according to claim 23, wherein the first web of fibers and the second web of fibers comprise cellulose fiber from chemical pulped wood comprising at least one of hardwood and softwood.

27. A method according to claim 23, wherein the first web of fibers and the second web of fibers comprise bleached cellulose fiber.

28. A method according to claim 23, wherein the first web of fibers has a weight of between about 18 lbs./3,000 ft.$^2$ and about 25 lbs./3,000 ft.$^2$.

29. A method according to claim 23, wherein the second web of fibers has a weight of between about 18 lbs./3,000 ft.$^2$ and about 25 lbs./3,000 ft.$^2$.

30. A method according to claim 23, wherein the first web of fibers and the second web of fibers have a Canadian Standard Freeness of about 325 cm$^3$.

31. A method according to claim 23, wherein the first ply and the second ply are the same.

32. A method according to claim 23, wherein the adhesive is selected from the group consisting of polyvinylacetate, ethylenevinylacetate, starch based adhesives, synthetic resins, and polyvinyl alcohol based adhesives.

33. A method according to claim 32, wherein the adhesive layer is polyvinylacetate.

34. A method according to claim 33, wherein the adhesive layer has a weight of between about 4 lbs./3,000 ft$^2$ and about 8 lbs./3,000 ft$^2$.

35. A method according to claim 23, wherein the adhesive layer is effective to holdout grease.

36. A method according to claim 23, wherein the laminate resists turpentine according to TAPPI test T 454 om-94 for longer than 180 minutes.

37. A method according to claim 23, wherein the laminate has less than 2.00% oil pass-through according to crease testing.

38. A method according to claim 36, wherein the laminate has less than 0.25% oil pass-through according to crease testing.

39. A method according to claim 23, further comprising the step of adhering a susceptor patch to the second film.

40. A method according to claim 23, wherein the laminate does not contain a fluorochemical component.

41. An article comprising:
  (a) a laminate comprising a first ply and a second ply; wherein the first ply comprises a first web of fibers having a first side and a second side, and a first film covering at least one of the first side and the second side, wherein the first web of fibers has a weight of between 12 and 45 pounds per 3000 ft$^2$ and is prepared from fibers exhibiting a Canadian Standard Freeness of between 200 cm$^3$ and 500 cm$^3$; wherein the second ply comprises a second web of fibers having a first side and a second side, and a second film covering at least one of the first side and the second side, wherein the second web of fibers has a weight of between 12 and 45 pounds per 3000 ft$^2$ and is prepared from fibers exhibiting a Canadian Standard Freeness of between 200 cm$^3$ and 500 cm$^3$; and an adhesive layer between the first ply and the second ply, adhering the first ply and the second ply together and contacting the first film and the second film, wherein the adhesive contacts the first film and the second film; and
  (b) a charge of oil and popcorn.

42. An article according to claim 41, wherein the first web of fibers and the second web of fibers comprise cellulose fiber from chemical pulped wood comprising at least one of coniferous and deciduous trees.

43. An article according to claim 41, wherein the first web of fibers and the second web of fibers comprise cellulose fiber from chemical pulped wood comprising at least one of hardwood and softwood.

44. An article according to claim 41, wherein the first web of fibers and the second web of fibers comprise bleached cellulose fiber.

45. An article according to claim 41, wherein the first web of fibers has a weight of between about 18 lbs./3,000 ft.$^2$ and about 25 lbs./3,000 ft.$^2$.

46. An article according to claim 41, wherein the second web of fibers has a weight of between about 18 lbs./3,000 ft.$^2$ and about 25 lbs./3,000 ft.$^2$.

47. An article according to claim 41, wherein the first web of fibers and the second web of fibers have a Canadian Standard Freeness of about 325 cm$^3$.

48. An article according to claim 41, wherein the first ply and the second ply are the same.

49. An article according to claim 41, wherein the first film and the second film are formed from a solution containing at least one of oxidized starches, ethylated starches, cationic starches, unmodified starches, starch based adhesives, proteins, synthetic resins, polyvinyl acrylates, polyvinyl acetate, polyvinyl alcohol, polyvinylalcohol based adhesives, vinyl acetate acrylic, styrene acrylates, vinyl acetate, ethylene vinyl acetate, styrene maleic anhydride, sodium alginate, sodium carboxymethyl cellulose, hydroxyl ethyl cellulose, polysodium acrylate, guar gum, gum arabic, and xanthan gum.

50. An article according to claim 41, wherein the first film and the second film are formed from a solution comprising starch and sodium alginate.

51. An article according to claim 41, further comprising a third film disposed on the opposite side of the first web of fibers as the first film.

52. An article according to claim 41, further comprising a fourth film disposed on the opposite side of the second web of fibers as the second film.

53. An article according to claim 41, wherein the adhesive comprises at least one of polyvinylacetate, ethylenevinylacetate, starch based adhesives, synthetic resins, and polyvinyl alcohol based adhesives.

54. A laminate according to claim 53, wherein the adhesive is polyvinylacetate.

55. An article according to claim 41, wherein the adhesive has a weight of between 4 lbs./3,000 ft$^2$ and 8 lbs./3,000 ft$^2$.

56. An article according to claim 41, wherein the adhesive is effective to holdout grease.

57. An article according to claim 41, wherein the laminate resists turpentine according to TAPPI test T 454 om-94 for longer than 180 minutes.

58. An article according to claim 41, wherein the laminate has less than 2.00% oil pass-through according to crease testing.

59. A laminate according to claim 58, wherein the laminate has less than 0.25% oil pass-through according to crease testing.

60. An article according to claim 41, wherein the laminate is provided in a roll.

61. An article according to claim 41, further comprising a susceptor patch.

62. An article according to claim 41, wherein the laminate does not contain a fluorochemical component.

* * * * *